June 2, 1942.    L. L. SEWELL ET AL    2,284,991
MACHINE FOR MIXING BEVERAGES
Filed Sept. 28, 1940    3 Sheets-Sheet 1

Inventor
Leonidas L. Sewell
John J. Flynn
By Jack A. Ashley
Attorney

June 2, 1942.   L. L. SEWELL ET AL   2,284,991
MACHINE FOR MIXING BEVERAGES
Filed Sept. 28, 1940   3 Sheets-Sheet 2

Inventor
Leonidas L. Sewell
John J. Flynn

By Jack A. Ashley
Attorney

Inventor
Leonidas L. Sewell
John J. Flynn
By Jack A. Dohley
Attorney

Patented June 2, 1942

2,284,991

UNITED STATES PATENT OFFICE 2,284,991

MACHINE FOR MIXING BEVERAGES

Leonidas L. Sewell and John J. Flynn, San Antonio, Tex.

Application September 28, 1940, Serial No. 358,762

4 Claims. (Cl. 259—57)

This invention relates to new and useful improvements in machines for mixing beverages, and particularly in machines for mixing beverages after the same have been bottled.

One object of this invention is to provide an improved machine for mixing beverages which will accommodate a whole crate of beverage bottles at one time, said mixing machine being adapted to rotate the bottles so as to thoroughly mix the contents thereof.

An important object of the invention is to provide an improved machine for mixing beverages which is adapted to receive beverage bottles and to automatically hold said bottles in position while they are being rotated; and to automatically release the bottles after such rotation is completed.

A further object of the invention is to provide an improved machine for mixing beverages which automatically stop its rotation after the beverage bottles have been rotated a predetermined number of times.

A still further object of the invention is to provide an improved machine for mixing beverages which is adapted to receive various sizes and numbers of beverage bottles.

A construction designed to carry out the invention will be hereinafter described, together with other features of the invention.

Figure 1:
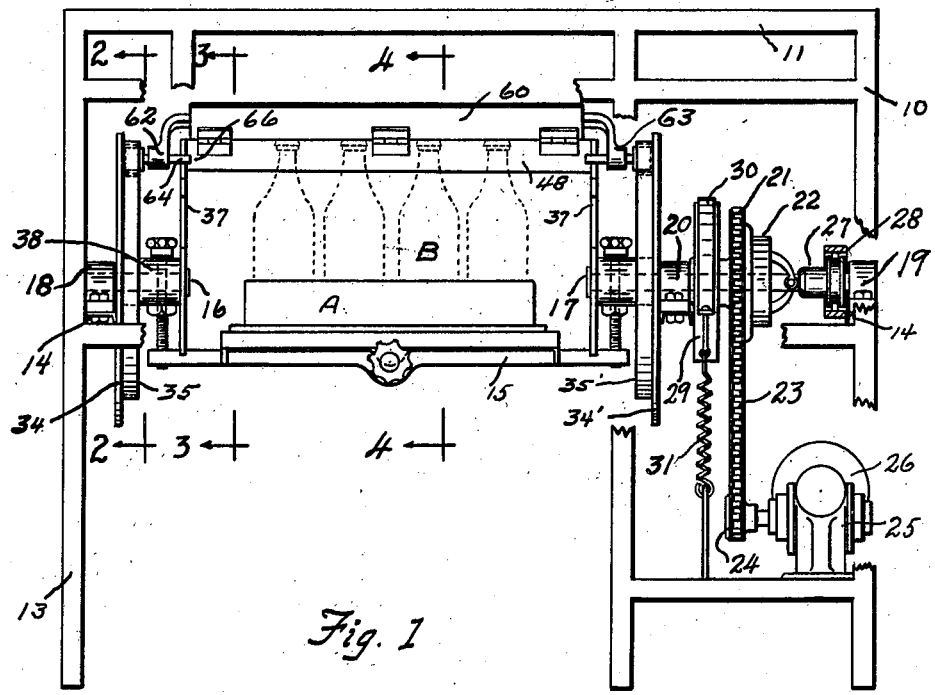
Figure 2:
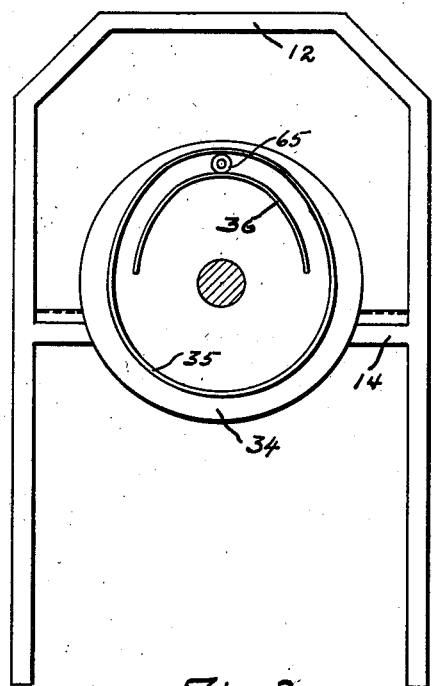
Figure 3:
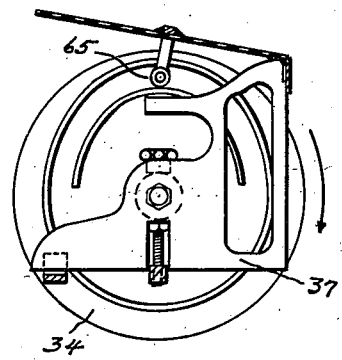
Figures 4, 5:
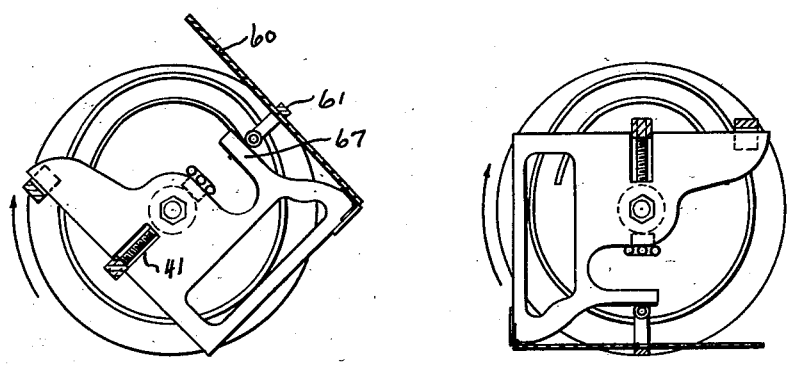
Figure 6:
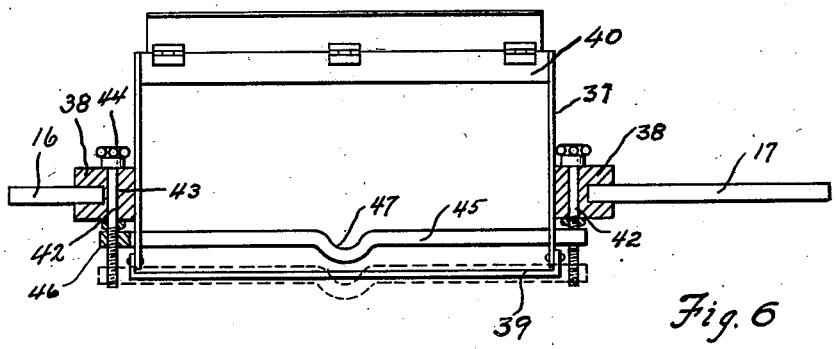
Figure 7:
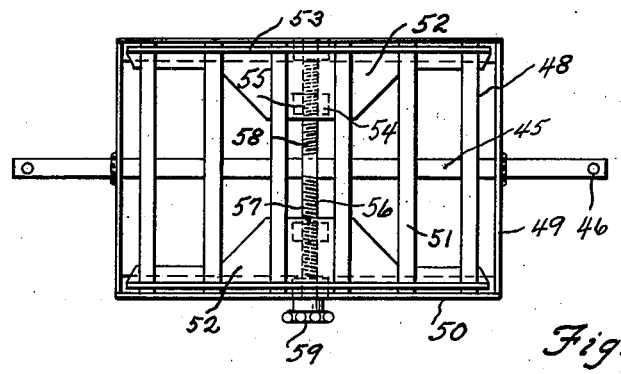
Figure 8:
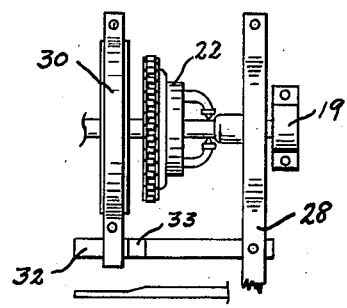
Figure 9:
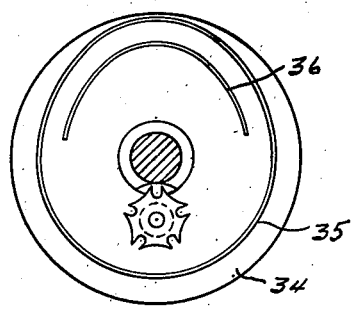
Figure 10:
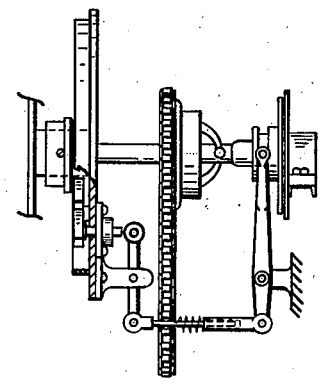

The invention will be more readily understood from a reading of the following specification and by reference to the accompanying drawings, in which an example of the invention is shown, and wherein:

Figure 1 is a view, partly in elevation and partly in section, of the front side of the machine, Figure 2 is a vertical sectional view taken on the line 2—2 of Figure 1, Figure 3 is a vertical sectional view taken on the line 3—3 of Figure 1, Figure 4 is a vertical sectional view similar to Figure 3, and showing the bottle cradle partially rotated, Figure 5 is a view similar to Figure 4, showing the bottle cradle still further rotated, Figure 6 is a view, partly in elevation and partly in section, showing the bottle cradle and the trunnion shafts extending therefrom, Figure 7 is a plan view of the bottle cradle, Figure 8 is a plan view of the clutch and brake mechanism, Figure 9 is a vertical sectional view, showing the construction of the cam plate and the star wheel, and Figure 10 is a view, partly in elevation and partly in section, showing a modification of the clutch and brake mechanism wherein the star wheel is utilized.

In the drawings, the numeral 10 designates a supporting frame having longitudinal members 11 and transverse members 12 secured to supporting legs 13. A plurality of supporting members 14 extend transversely of the frame at a point near the mid portion thereof. As may be noted from the drawings, there are three of the transverse supporting members 14; one at each end of the frame and one at a point spaced toward one end of the frame from the center thereof. A bottle cradle 15 is mounted within the frame 10 by means of trunnion shafts 16 and 17 which extend from the left and right-hand sides, respectively, of said cradle. As is shown in Figure 6, the right-hand shaft 17 is considerably longer than the left-hand shaft 16. A bearing block 18 is secured to the left-hand member 14, and the trunnion shaft 16 is mounted therein. A similar bearing block 19 is secured to the right-hand member 14, and the end of the shaft 17 mounted therein. Thus, the cradle is supported within the frame by means of shafts 16 and 17. An additional bearing block 20 is disposed upon the central member 14 and engages the shaft 17 near the juncture of said shaft with the cradle.

A gear wheel 21 is secured on the shaft 17 by a suitable clutch mechanism 22. A chain 23 connects the gear wheel 21 to a pinion 24, which is adapted to be rotated by some suitable gear means 25 connected to a motor 26. The motor 26 may be an electrical motor or any suitable source of power. The clutch 22 is adapted to be engaged and disengaged by means of a clutch actuator 27 mounted upon the shaft 17. The actuator 27 may be operated manually by a suitable lever arrangement 28 which is adapted to move the actuator into, and out of, engagement with the clutch 22.

A brake drum 29 is secured to the shaft 17 between the gear wheel 21 and the bearing block 20. A brake band 30 partially encircles the drum 29 so as to engage the same, and has one end secured to the frame 10. The other end of the band is connected to the opposite side of the frame through a spring 31, said spring tending to press the band against the periphery of the drum 29.

An elongate bar 32 is connected to the lever means 28 and is adapted to be moved longitudinally by said means. The bar 32 extends beneath the spring-attached end of the brake band, and is provided with a projection 33 which is adapted to engage beneath the movable end of the brake band and lift the same upwardly as the bar is moved longitudinally. In this manner, when the operator moves the lever means 28 to engage the clutch 22, the bar 32 is moved longitudinally so as to lift the brake band from engagement with the drum 29 and allow the shaft 17 to be rotated through said clutch. As the clutch is disengaged, the brake band 30 again engages the brake drum and halts the rotation of the shaft 17.

A circular plate 34 is secured to the inner side of the left-hand member 14 concentrically of the shaft 16. A similar plate 34' is secured to the central member 14 concentrically with the the shaft 17. The plates 34 and 34' are provided with inwardly projecting flanges 35. The flanges 35 form a substantially elliptical-shaped cam surface, and are so placed upon the plates 34 and 34' as to have their lower portions nearer to the center of the plates than their upper portions. An arcuate flange 36 is secured to the inner face of each of the plates 34 and 34' within the flange 35. Each of the flanges 36 is mounted upon the upper portion of the plates and is of such curvature as to be spaced a constant distance from the flanges 35.

The bottle cradle 15 is substantially rectangular in shape and includes a pair of plate-like side members 37. Each of the side members 37 has a laterally extending boss 38 formed thereupon, the bosses 38 being in axial alinement with each other. The trunnion shafts 16 and 17 are secured to the bosses 38, and extend axially therefrom. A longitudinal strap 39 extends across the lower front end of the cradle, and is secured at either end to one of the side members 37. A similar strap 40 extends longitudinally of the cradle at the upper back end thereof, and is secured at either end to one of the side members 37. In this manner the straps 39 and 40 rigidly secure the side members 37 to one another.

Each of the side members 37 is provided with an elongate slot 41 which extends in a vertical direction from the lower edge of said members to a point spaced below the bosses 38. A yoke screw 42 is disposed within a vertical, diametrical opening 43 formed in each of the bosses 38. A hand wheel 44 is formed upon the upper end of each of the yoke screws 42 so as to allow the screws to be rotated by hand and to support the screw within the bosses 38. An elongate bar 45 extends transversely of the cradle and has either end disposed within one of the slots 41. Screw-threaded openings 46 are provided in the ends of the bar 45, and are adapted to be engaged by the yoke screws 42. Obviously, rotation of said screws will cause the bar 45 to move upwardly and downwardly within the slots 41. The central portion 47 of the bar 45 is offset for reasons to be discussed hereinafter.

A bottle crate rack 48 is welded or otherwise secured to the bar 45 in a horizontal plane with respect to the cradle 15. The rack 48 is substantially rectangular in shape, and is provided with end members 49 and side members 50. The rack is of such shape and size as to receive a beverage crate A containing beverage bottles B. A plurality of transverse bottom members 51 extend across the rack and form supports for the beverage crate. A clamp 52 is provided at either side of the rack beneath the transverse members 51. Each of the clamps 52 is provided with an upstanding flange 53 having openings (not shown) for receiving the transverse members 51. As may be seen in Figures 1 and 7, the clamps 52 extend substantially throughout the length of the rack. Each of the clamps is provided with a lug 54 on their under side, said lugs being provided with transverse screw-threaded openings 55.

A rod 56 extends transversely of the rack and is provided with right-hand threads 57, throughout substantially half its length, and left-hand threads 58, throughout the other half of its length. The rod is journaled to each side of the rack and extends through the screw-threaded openings 55. A hand wheel 59 is provided on the front end of the rod which extends beyond the side of the rack 48, so that the rod may be rotated by hand. As will be noted in Figure 7, right-hand rotation of said rod will cause the clamps 52 to move together or toward one another, while left-hand rotation of the rod will cause the clamps to move away from each other. Thus, a beverage bottle crate may be placed upon the rack and clamped into position by means of the clamps 52. The offset portions 47 of the bar 45 serve to accommodate the rod 56 so that the latter is free to rotate.

A rectangular lid 60 is hinged to the strap 40 so as to extend forwardly from said strap in a vertical plane. A bar 61 extends longitudinally of the lid 60 near the mid portion thereof and projects upon the lid at either end. The projecting ends 62 of the bar 61 are curved downwardly and formed with bosses 63 upon their extremities. A spindle bolt 64 is mounted in each of the bosses 63 and extends longitudinally of the cradle. A cam roller 65 is provided on the outer end of each of the spindle bolts 64, said cam rollers being engaged within the flanges 35 of the plates 34 and 34'. The inner ends 66 of the spindle bolts project a short distance from the bosses so as to overlie the side members 37. The side members are provided with projections 67 adapted to engage the inner ends 66 of the bolts, and prevent the lid from swinging downwardly.

As the cradle is rotated by means of engagement of the clutch means 22 with the shaft 17, the cradle 15, along with the lid 60, will be rotated about its longitudinal axis. As the cradle rotates into the position shown in Figure 4 of the drawings, the engagement of the flanges 35 with the cam rollers 65 will cause the lid to move downwardly with respect to the cradle and the rack 48, thus clamping the beverage bottles B securely within the bottle crate A. The lid maintains this position throughout the lower 180° of rotation, as is shown in Figure 5, until the cam rollers approach the uppermost position of the flanges 35. At this point the weight of the bottles is sufficient to hold them within the bottle crate, and the weight of the lid 60 will press the cam rollers 65 into engagement with the flanges 36. As the cradle returns to an upright position, the flanges 36 will lift the rollers 65 and the lid 60 into the position shown in Figures 1 and 3. In this position the bottles and the crate may be removed from the machine and another crate of bottles inserted for mixing. The operation is thus repeated for each crate of bottles.

As hereinbefore set forth, the yoke screws 42 may be rotated to move the bar 45 upwardly and downwardly with respect to the side members 37 and the lid 60. This operation causes the rack 48 to also move upwardly and downwardly, so that bottles of different sizes may be handled by the machine. For handling short bottles, the bar 45 and the rack 48 are moved upwardly so that the upper ends of the bottles will contact the lid 60 when the same is in the lower position. Similarly, for tall bottles, the bar and rack will be moved downwardly.

If it is so desired, any suitable type of an automatic clutch-engaging and disengaging means may be employed. Such an arrangement is shown in Figures 9 and 10 of the drawings. This particular clutch-engaging means utilizes a Geneva star wheel and since this type of mechanism is well known, it is not deemed necessary to fully explain its construction.

Various changes, alterations and modifications may be made in the size, shape and arrangement of the herein described elements within the scope of the appended claims.

What we claim and desire to secure by Letters Patent is:

1. A device of the character described including, a cradle, means for rotating said cradle through a complete revolution, a hinged lid spaced above said cradle, a continuous cam surface disposed at one end of the cradle and held in a fixed position, and means connected to said lid adapted to bear continuously on said cam surface whereby as the cradle is rotated through one or more revolutions the movements of the lid will be controlled by the connecting means between the lid and the cam surface.

2. A device of the character described including, a cradle, means for rotating said cradle, an ovate cam disposed at one end of the cradle and held in a fixed position, and a lid hinged above the cradle and having means connected thereto and engaging the cam whereby as the cradle is rotated in one direction the lid will be lowered and raised with respect to the cradle.

3. A device of the character described including, a frame, a pair of shafts mounted upon said frame, a rack adjustably connected to said shafts by screw members, a lid hinged above the rack, a cam disposed at one end of the rack and held in a fixed position so as to surround one shaft, means connected to the hinged lid and bearing against the cam surface so as to actuate the lid to cause it to swing vertically with respect to the rack as the latter is rotated upon the shafts, and means for rotating at least one of said shafts.

4. A device of the character described including, a frame, a pair of shafts mounted in said frame, a rack suspended from said shafts and adapted to be revolved thereupon, said suspending means consisting of screw members adapted to be rotated so as to vary the position of the rack with respect to the shafts, a hinged lid secured to the rack, an ovate cam surrounding one of said shafts and held in a fixed position, actuating means secured to the lid and restrained within the ovate cam, whereby as the rack rotates upon the shafts the movements of the lid are controlled throughout a complete revolution by the engagement of the actuating means with the cam, and means for rotating the rack through a plurality of revolutions.

LEONIDAS L. SEWELL.
JOHN J. FLYNN.